United States Patent [19]

Iyama

[11] Patent Number: 5,327,264
[45] Date of Patent: Jul. 5, 1994

[54] IMAGE TRANSMISSION APPARATUS FOR SELECTIVELY CHANGING AN IMAGE DISPLAY PIXEL NUMBER

[75] Inventor: Masaru Iyama, Ebina, Japan

[73] Assignee: Matsushita Electric Industrial Co., Ltd., Osaka, Japan

[21] Appl. No.: 858,939

[22] Filed: Mar. 26, 1992

[30] Foreign Application Priority Data

Apr. 5, 1991 [JP] Japan .................. 3-072859

[51] Int. Cl.$^5$ .......... H04N 1/46; H04N 1/36; H04N 9/455; H04N 9/07
[52] U.S. Cl. .................. 358/515; 348/210; 348/242; 358/326; 358/409
[58] Field of Search ......... 358/17, 19, 20, 75, 358/409, 909, 41, 44, 326; H04N 9/455

[56] References Cited

U.S. PATENT DOCUMENTS

| | | | |
|---|---|---|---|
| 4,333,103 | 6/1982 | Koiwa et al. | 358/19 |
| 4,558,349 | 12/1985 | Sasaki | 358/17 |
| 5,166,779 | 11/1992 | Moyer | 358/19 |

FOREIGN PATENT DOCUMENTS 290376 3/1990 Japan .
2281877 11/1990 Japan .

OTHER PUBLICATIONS

Honda, et al, "Still Video Transceiver over The General Telephone Networks," IEE Trans. Commun., vol. 88, No. 197, IE 88-58, pp. 27-34, Sep. 1988.

*Primary Examiner*—Edward L. Cole, Sr.
*Assistant Examiner*—Kim Yen Vu
*Attorney, Agent, or Firm*—Stevens, Davis, Miller & Mosher

[57] ABSTRACT

An image transmission apparatus comprises a color separating circuit for dividing a video image signal into color signals and a color burst signal, a sampling clock generating circuit for generating a clock signal having a frequency corresponding to a designated pixel number, and a sampling clock synchronizing circuit for converting the clock signal into a sampling clock signal synchronized with the color burst signal. A sampling frequency of a sampling unit (an A/D converter), which samples the color signals in accordance with the sampling clock signal to thereby produce sampled image data, is controlled in accordance with the sampling clock signal. The sampled image data are stored in a frame memory. The sampled image data stored in the frame memory are transmitted from an image data transmitting section composed of a static image compressing/expanding circuit and a transmitting/receiving section. With the image transmission apparatus constructed as described above, a pixel number of image data can be changed to an arbitrary value, so that a proper original image can be reproduced on the receiving side where the transmitted image data are received.

3 Claims, 4 Drawing Sheets

IMAGE TRANSMISSION APPARATUS FOR SELECTIVELY CHANGING AN IMAGE DISPLAY PIXEL NUMBER

BACKGROUND OF THE INVENTION

The invention relates to an image transmission apparatus, and, more particularly, to an image transmission apparatus suitable for transmitting an image photographed by an electronic still camera or transmitting a static video image photographed by a video camera or an ITV camera.

As conventional ordinary image transmission apparatuses, transmission apparatuses 15a and 15b are known which are respectively connected to a transmission network 13b such as a public line, ISDN network, automobile telephone network, or the like, as shown in FIG. 2. The transmission apparatus 15a receives an image from a video floppy 1 or a video camera 3 and supplies data relating to the received image to the transmission network 13b through a transmission line 13a. The transmission apparatus 15b, on the other hand, receives the image data from the transmission network 13b and supplies an image relating to the received image data to a video printer 10 and a display 11 and also transmits the image to a data processing apparatus 16 through a transmission line 14a. The image processed by the data processing apparatus 16 is sent to a printer 17 and a display 18. As a structural arrangement of each of the transmission apparatuses 15a and 15b, a circuit construction such as shown in FIG. 1 is used.

That is, each of the transmission apparatuses 15a and 15b of a conventional ordinary image transmission apparatus are composed of: a reader 2; a color separating circuit 4; an A/D converting circuit 5; a sampling clock circuit 6; a frame memory 7; a display control circuit 8; a D/A converting circuit 9; a static image compressing/expanding circuit 12; a transmitting/receiving section 13; and a host interface circuit 14. The host interface circuit 14 is connected to the data processing apparatus 16 through the transmission line 14a. The transmitting/receiving section 13 is connected to the transmission network 13b through the transmission line 13a. When the reader 2 read image data stored in the video floppy 1, the read-out image data are supplied to the color separating circuit 4 as a video signal representing an image photographed by the electronic still camera. Further, a video signal representing an image photographed by the video camera 3 is also supplied to the color separating circuit 4. The color separating circuit 4 divides the video signal from the reader 2 or the video camera 3 into color signals of Y, U, and V or R, G, and B and a color burst signal. The color separating circuit 4 then supplies the color burst signal to the sampling clock circuit 6 and supplies the color signals to the A/D converting circuit 5. The A/D converting circuit 5 operates to quantize and sample the color signals in accordance with sampling clocks to thereby produce image data. The image data thus produced are stored in the frame memory 7. When the image data stored in the frame memory 7 is transmitted to an apparatus which is located at a distant place, the image data in the frame memory are supplied to and compressed by the static image compressing expanding circuit 12, and the image data, an amount of which has been reduced for data transmission, are transmitted from the transmitting/receiving section 13 to a public line, an ISDN network, an automobile telephone network, or the like through the transmission line 13a. Then, the image data are transmitted to the transmission apparatus 15b on the receiving side. The image data are received by the receiving side through the transmitting/receiving section 13 of the transmission apparatus 15b on the receiving side. The compressed and transmitted image data are expanded by the static image compressing/expanding circuit 12 and are stored in the frame memory 7. Thereafter, the image data are transferred to the video printer 10 and the display 11 through the display control circuit 8 and the D/A converting circuit 9. Thus, the received image data are printed by the video printer 10, and simultaneously an image thereof is displayed on a screen of the display 11.

On the other hand, the image data received by the host interface circuit 14 are transferred to the data processing apparatus 16 in FIG. 2 through the transmission line 14a to be stored in a data base so that a data base for the image data is provided. The image data are retrieved when required. The content of the image data is printed by the printer 17, or an image of the image data is displayed on a screen of the display 18.

In the above-described conventional transmission apparatuses, however, the number of pixels of an image is determined by a value which is a multiple of a clock frequency 3.48 MHz of a clock signal which is generated in the sampling clock circuit 6 by using a color burst signal. Therefore, in a number of transmission apparatuses, the number of horizontal × vertical pixels is chosen to be 768×480 pixels for a high definition type transmission apparatus, 384×240 pixels for a middle definition type transmission apparatus, and 192×120 pixels for a low definition type transmission apparatus. Therefore, in a printer 17 and a display 18 which are used in the data processing apparatus 16, etc., when a pixel number ratio between the horizontal pixels and the vertical pixels is chosen to be 1:1, there arises a problem that a reproduced image is deformed as compared with an original image.

SUMMARY OF THE INVENTION

The present invention is intended to solve the above-mentioned problem which is encountered in conventional transmission apparatuses, and it is an object of the present invention to provide an image transmission apparatus which can arbitrarily change the number of pixels of an image.

To accomplish the above-mentioned object, according to a first embodiment of the present invention, there is provided an image transmitting apparatus comprising: color separating means for dividing a video signal into color signals and a color burst signal; clock generating means for generating a clock signal having a frequency corresponding to a designated number of pixels; sampling clock generating means for converting the clock signal into a sampling clock signal synchronized with the color burst signal; sampling means for sampling the color signals in accordance with the sampling clock signal to produce image data; memory means for storing the sampled image data; and image data transmitting means for transmitting the image data stored in the memory means.

According to a second embodiment of the present invention, there is provided an image transmission apparatus comprising: color separating means for dividing a video signal into color signals and a color burst signal; sampling means for sampling the color signals in accordance with a sampling clock signal synchronized with the color burst signal to produce image data; first memory means for storing the sampled image data; image data converting means for receiving the image data from the first memory means and converting the received image data into image data of a designated number of pixels; second memory means for storing output image data from the image data converting means; and image data transmitting means for transmitting the image data stored in the second memory means.

Thus, according to the present invention, the frequency of the clock signal is changed in correspondence with the designated number of pixels, the sampling clock signal synchronized with the color burst signal is produced from the clock signal, and color signals are sampled in accordance with the sampling clock signal thereby to produce image data. Accordingly, it is possible to change the number of pixels of an image to the designated number of pixels.

Further, the image transmitting apparatus of the present invention is constructed so that image data produced by the sampling process are stored in the memory means and thereafter the stored image data are converted into image data of the designated number of pixels, whereby it becomes possible to change the number of pixels of an image to an arbitrary number of pixels. Consequently, it becomes possible to change the number of pixels of an image to be transmitted so that it coincides with the number of pixels of an image to be displayed on the receiving side. As a result, it is possible for the apparatus on the receiving side to print or display an image in compliance with the image data without causing an original image to be subjected to any deformation or distortion.

DESCRIPTION OF THE PREFERRED EMBODIMENTS

An embodiment of the present invention will be described hereinbelow with reference to the accompanying drawings.

Figure 1:
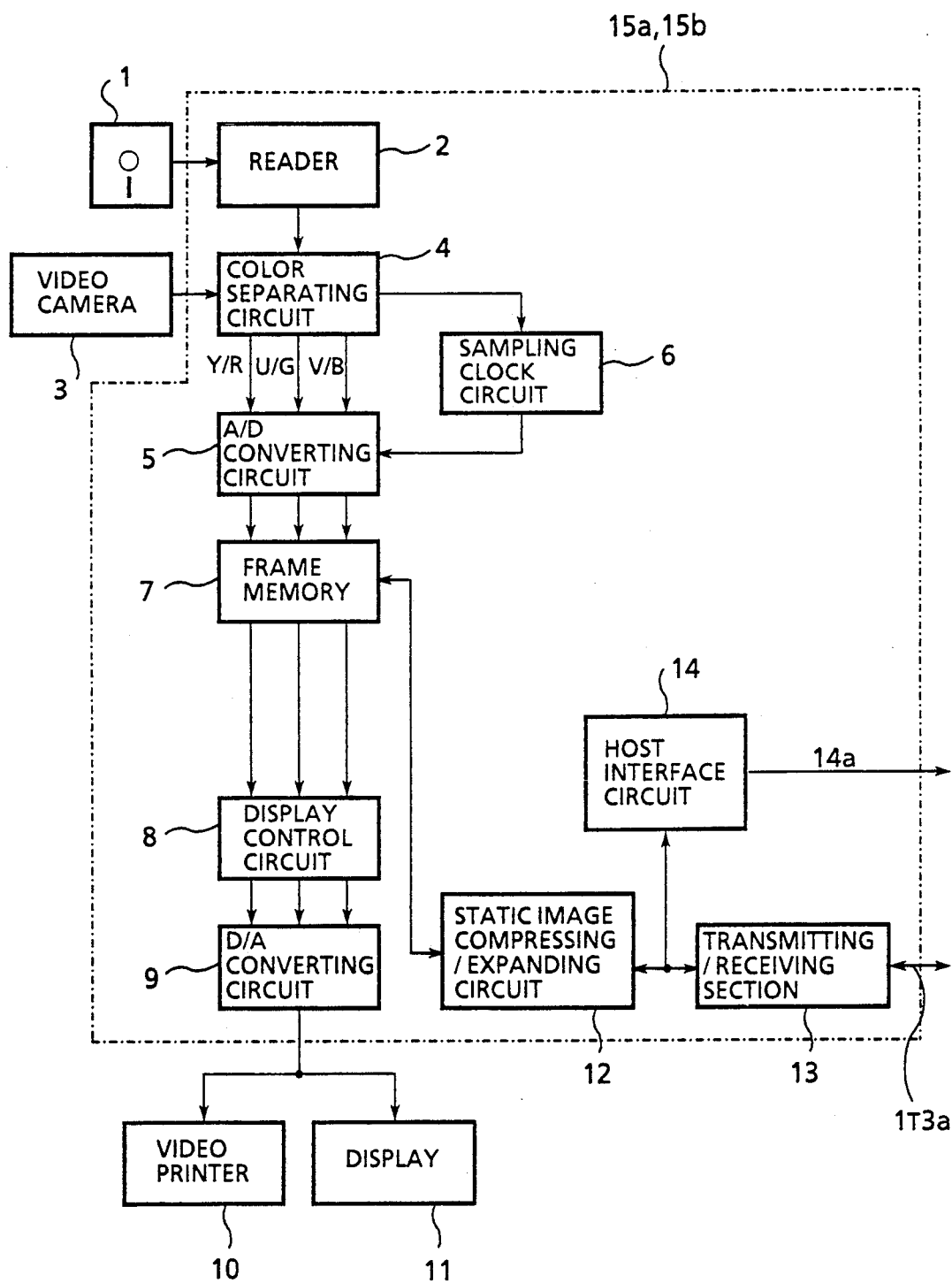
FIG. 1 is a block diagram showing a conventional image transmitting apparatus.
Figure 2:
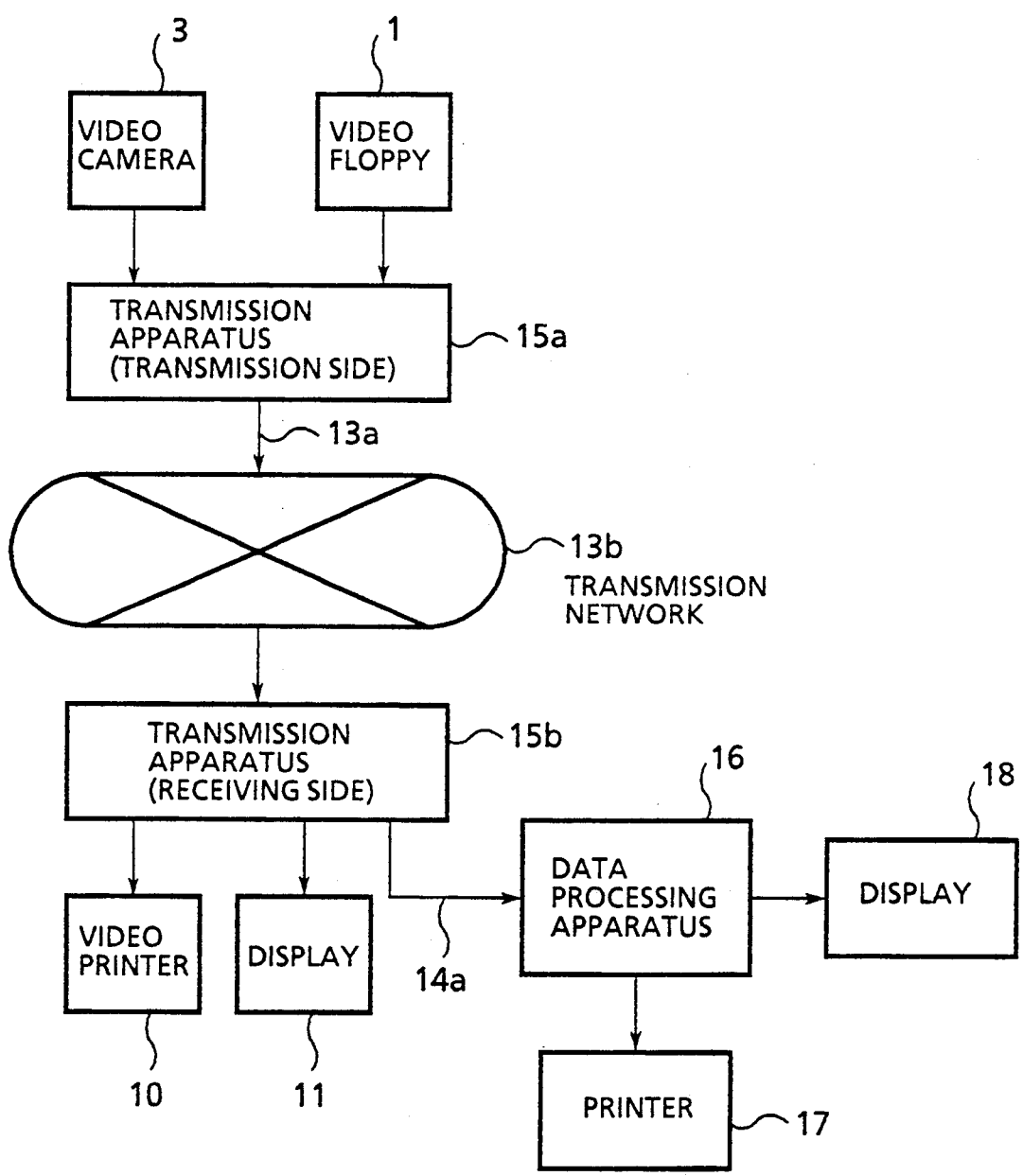
FIG. 2 is a structural view of a general transmission system.
Figure 3:
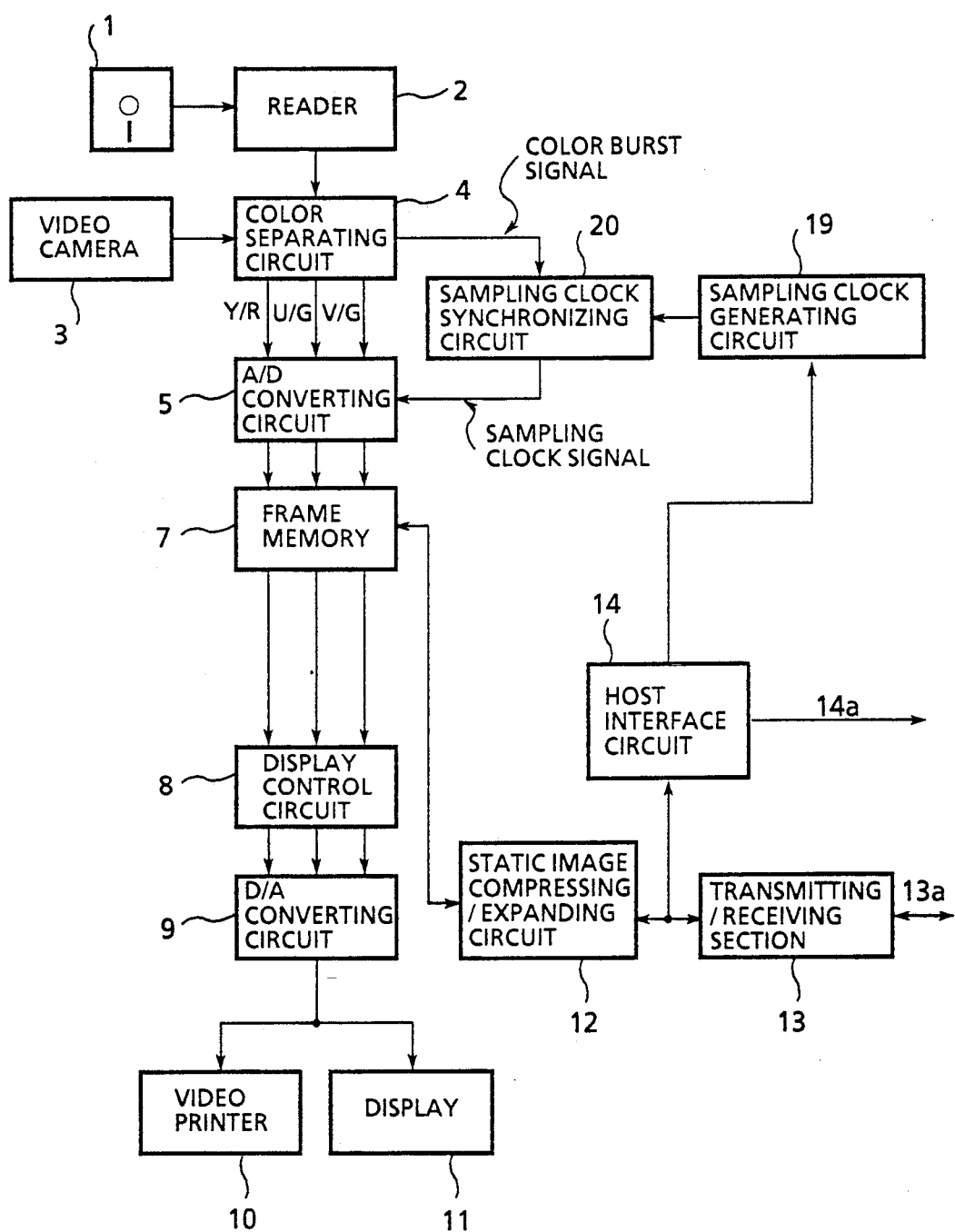
FIG. 3 is a block diagram showing an image transmission apparatus of an embodiment of the present invention.

FIG. 3 shows the construction of a first embodiment of the present invention. An image transmission apparatus shown in FIG. 3 comprises: a reader 2; a color separating circuit 4; an A/D converting circuit 5; a frame memory 7; a display control circuit 8; a D/A converting circuit 9; a static image compressing/ expanding circuit 12; a transmitting/receiving section 13; a host interface circuit 14; a sampling clock generating circuit 19; and a sampling clock synchronizing circuit 20. The reader 2 is connected to a video floppy 1. The color separating circuit 4 is connected to a video camera 3. The D/A converting circuit 9 is connected to a printer 10 and a display 11. The host interface circuit 14 is connected to the data processing apparatus 16 shown in FIG. 2 through a transmission line 14a. The transmitting/receiving section 13 is connected to the transmission network 13b shown in FIG. 2 through a transmission line 13a.

The reader 2 reads image data stored on the video floppy 1 and outputs the read-out image data to the color separating circuit 4 as a video signal. A video signal produced by the video camera 3 is supplied to the color separating circuit 4. The color separating circuit 4 divides the video signal supplied from the reader 2 or the video camera 3 into color signals (R, G, B or Y, U, V) for an original image and a color burst signal. The the color separating circuit 4 supplies the color signals to the A/D converting circuit 5 and the color burst signal to the sampling clock synchronizing circuit 20. A clock signal generated by the sampling clock generating circuit 19 is supplied to the sampling clock synchronizing circuit 20. The sampling clock synchronizing circuit 20 converts the clock signal into a sampling clock signal synchronized with the color burst signal. The sampling clock signal is supplied to the A/D converting circuit 5. The A/D converting circuit 5 is constructed as sampling means for sampling the color signals in accordance with the sampling clock signal to produce image data. The sampled image data are sequentially stored in the frame memory 7. At the time when the A/D converting circuit 5 produces image data, as information for designating the number of pixels, 640×480 pixels, for example, is supplied to the host interface circuit 14, the clock frequency is modified in the sampling clock generating circuit 19 in accordance with an instruction from the host interface circuit 14. Thus, a clock signal having a frequency, which corresponds to a designated pixel number, is generated by the sampling clock generating circuit 19. As a result, the frequency of a sampling clock signal, which is generated by the sampling clock synchronizing circuit 20, is modified to have a value corresponding to the designated pixel number. Therefore, the number of pixels of image data, which are produced by the A/D converting circuit 5, can be changed in response to the frequency of a sampling clock signal, so that it becomes possible to arbitrarily change the number of pixels of an image to be transmitted, and also it becomes possible to arbitrarily change a pixel number ratio between a horizontal pixel number and a vertical pixel number of image data. Thus, as an example, it is possible for the host interface circuit 14 to make the number of pixels of image data, which are produced by the A/D converting circuit 5, coincide with the designated pixel number transmitted in accordance with a protocol employed between the image transmission apparatuses on the transmission side and the receiving side, before the data processing apparatus 16 on the receiving side sends out an image.

The image data stored in the frame memory 7 are supplied to the transmission line 13a through the static image compressing/expanding circuit 12 and the transmitting/receiving section 13, and also they are supplied to the video printer 10 and the display 11 through the display control circuit 8 and the D/A converting circuit 9.

The image transmission apparatus of a second embodiment of the present invention will be described with reference to FIG. 4.

Figure 4:
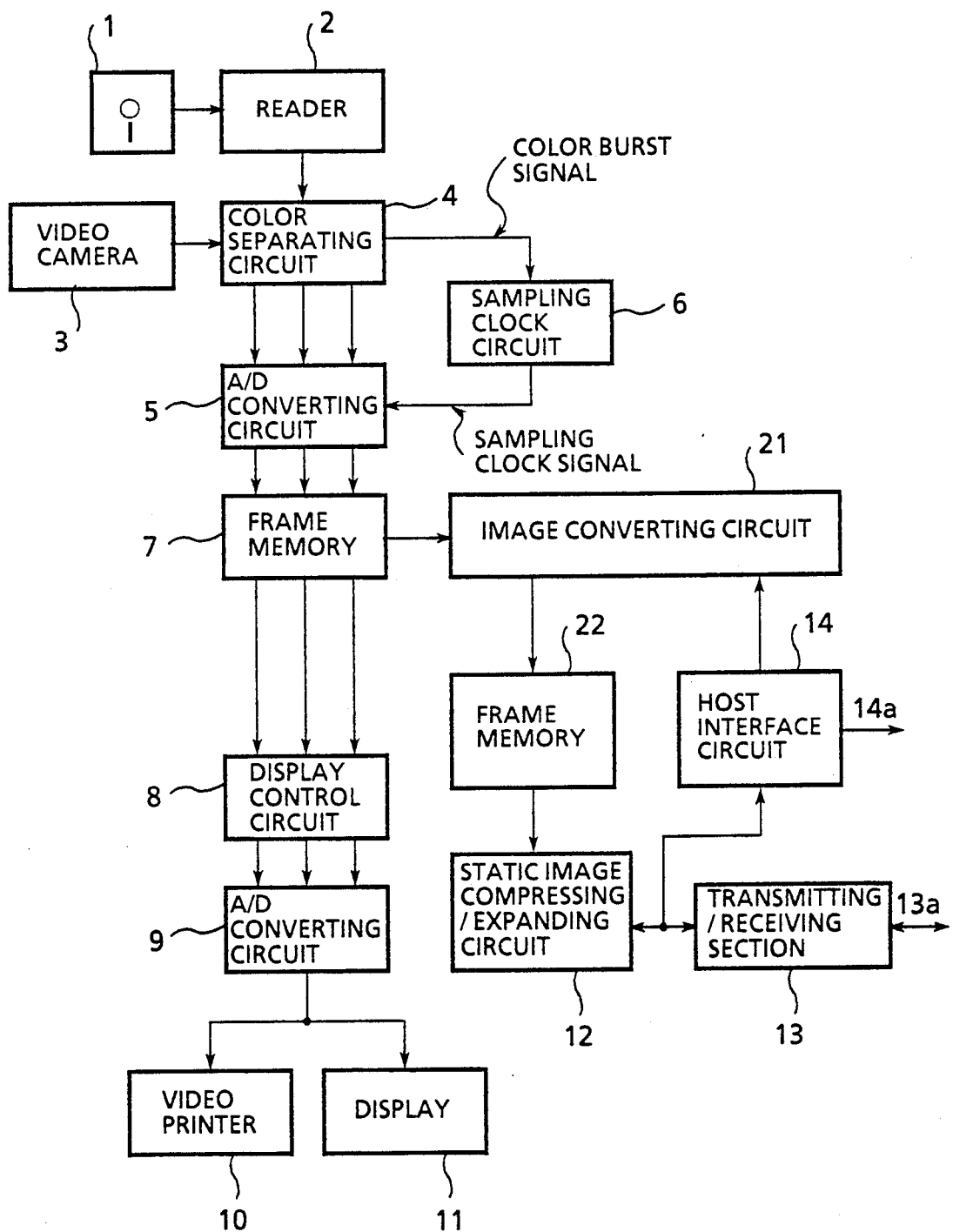
FIG. 4 is a block diagram showing an image transmission apparatus of another embodiment of the present invention.

In the second embodiment shown in FIG. 4, the image transmission apparatus comprises a sampling clock circuit 6 for generating a sampling clock signal synchronized with a color burst signal supplied from the color separating circuit 4, in place of the sampling clock synchronizing circuit 20 and the sampling clock generating circuit 19 shown in FIG. 3. Image data stored in the frame memory 7 are sent to an image converting circuit 21 for converting the inputted image data into image data of the designated pixel number.

Further, a frame memory 22 is provided which stores output image data from the image converting circuit 21, and the frame memory 22 is connected to the static image compressing/expanding circuit 12. In addition, the image converting circuit 21 is connected to the host interface circuit 14.

Since the other part of the construction of this second embodiment is similar to that shown in FIG. 3, the same component elements as those shown in FIG. 3 are designated by the same reference numerals and the descriptions thereof are omitted.

In the second embodiment, when the number of pixels of an image to be transmitted is indicated by an instruction from the host interface circuit 14, the image converting circuit 21 converts associated image data into image data of the designated pixel number, and the converted image data are stored in the frame memory 22. For instance, in the case where the A/D converting circuit 5 produces image data of 768×480 pixels from color signals supplied from the color separating circuit 4, in accordance with a sampling clock signal supplied from the sampling clock circuit 6, and then the image data are stored in the frame memory 7, the image converting circuit 21 takes in the image data stored in the frame memory 7 in accordance with an instruction from the host interface circuit 14. The image converting circuit 21 executes a processing of changing the taken-in image data to have the designated pixel number, a processing of correcting a boundary line arrangement, etc. so that the taken-in image data are converted into image data of 640×480 pixels. Then, the converted image data are stored in the frame memory 22. The image data stored in the frame memory 22 are transmitted to the transmission line 13a through the static image compressing/expanding circuit 12 and the transmitting-/receiving section 13.

According to the second embodiment described above, the image converting circuit 21 converts the number of pixels of image data in accordance with an instruction from the host interface circuit 14, whereby it is possible to change the number of pixels of an image to be transmitted so that it conforms to the apparatus on the receiving side.

As will be clearly understood from the above-described embodiments of the present invention, since the sampling frequency used to produce image data is changed to a frequency corresponding to the designated pixel number, the number of pixels of image data can be changed to an optional pixel number, whereby it is possible for the apparatus on the receiving side, which receives transmitted image data, to reproduce a proper original image. Similarly, since sampled image data are converted into image data of the designated pixel number, the apparatus of the present invention has an excellent advantage such that a proper original image can be reproduced by the apparatus on the receiving side which has received transmitted image data.

I claim:

1. An image transmission apparatus comprising:
   color separating means for dividing a video signal into color signals and a color burst signal;
   sampling means for sampling the color signals supplied from said color separating means in accordance with a sampling clock signal synchronized with the color burst signal and producing sampled image data;
   first memory means for storing the sampled image data supplied from said sampling means;
   image data converting means for receiving the sampled image data stored in said first memory means and converting the sampled image data into image data of a designated number of pixels;
   second memory means for storing output image data from said image data converting means; and
   image data transmitting means for transmitting the image data stored in said second memory means.

2. An image transmission apparatus according to claim 1, wherein said image data converting means includes means for changing the sampled image data supplied from said first memory means to image data of a display pixel number proper to the receiving side.

3. An image transmission apparatus comprising:
   color separating means for dividing a video signal into color signals and a color burst signal;
   sampling clock generating means for generating a clock signal of a frequency corresponding to a designated number of pixels;
   sampling clock synchronizing means responsive to the color burst signal for converting the clock signal supplied from said sampling clock generating means into a sampling clock signal synchronized with the color burst signal;
   sampling means for sampling the color signal supplied from said color separating means in accordance with the sampling clock signal supplied from said sampling clock synchronizing means and producing sampled image data;
   memory means for storing the sampled image data;
   image data transmitting means for transmitting the sampled image data stored in said memory means; and
   host interface means, operatively associated with said clock generating means, for (i) receiving information indicative of said designated number of pixels from a receiving station which receives said sampled image data transmitted by said image data transmitting means and displays or prints said received image data in accordance with said designated number of pixels, (ii) generating a control signal indicative of said designated number of pixels, and (iii) supplying said control signal to said clock generating means.

* * * * *